United States Patent [19]

Gibney

[11] Patent Number: 4,563,831
[45] Date of Patent: Jan. 14, 1986

[54] FISHING FLOAT
[76] Inventor: James W. Gibney, P.O. Box 263, Edgewater, Fla. 32032
[21] Appl. No.: 614,268
[22] Filed: May 25, 1984

Related U.S. Application Data

[63] Continuation-in-part of Ser. No. 453,775, Dec. 22, 1982, abandoned.

[51] Int. Cl.⁴ ............................................. A01K 93/00
[52] U.S. Cl. .................................... 43/44.91; 43/44.87
[58] Field of Search ................... 43/44.91, 44.87, 44.9, 43/43.1

[56] References Cited

U.S. PATENT DOCUMENTS

| | | | |
|---|---|---|---|
| 1,883,574 | 10/1932 | Cleeland | 43/43.1 |
| 2,001,241 | 5/1935 | Vries | 43/44.9 |
| 2,315,048 | 3/1943 | Croft | 43/44.9 |
| 2,787,079 | 4/1957 | Wilson | 43/44.87 |
| 2,849,827 | 9/1958 | Gardiner | 43/44.9 |
| 2,957,266 | 10/1960 | Liselotte | 43/44.91 |
| 2,958,153 | 11/1960 | Yerman | 43/44.91 |
| 3,107,451 | 10/1963 | Sitzler | 43/44.87 |
| 4,145,833 | 3/1979 | Ratte | 43/44.91 |

Primary Examiner—Gene P. Crosby
Attorney, Agent, or Firm—Macdonald J. Wiggins

[57] ABSTRACT

A fishing float having a buoyant body with a spherical or ellipsoidal shape. A slot is provided essentially half way through the body of the float to a central axis thereof having a line securing hook disposed at each end of the slot. When the float is placed on a fish line, the line is inserted into the slot, snapped into the hooks and aligned with the central axis of the float. A plurality of ridges in the slot maintain tension of the line to prevent slippage. The float may be moved along the fish line with slight force. The hooks prevent dislodgement of the float from striking of objects or from getting caught in weeds or the like during use.

8 Claims, 5 Drawing Figures

FISHING FLOAT

The present application is a continuation-in-part of Ser. No. 453,775 filed Dec. 22, 1982, now abandoned.

BACKGROUND OF THE INVENTION

1. Field of the Invention

The present invention relates to fishing floats, and more particularly to a float which permits a positive attachment to a fishing line and provides ease of adjustment of position of the float along the line.

2. Description of the Prior Art

Fishing line floats or bobbers are widely used and a large number of designs have been proposed in the past. Typical of the prior art are the float designs shown in the following U.S. Patents: De Vries, U.S. Pat. No. 2,001,241; Croft, U.S. Pat. No. 2,315,048; Smith, U.S. Pat. No. 2,483,788; Hockenhull, U.S. Pat. No. 2,572,340; Perry, U.S. Pat. No. 2,575,832; Zaikoski, U.S. Pat. No. 2,578,874; and Blockinger, U.S. Pat. No. 2,582,619. Ideally, a float or bobber should be a very low cost device that is quickly and easily attached to a fishing line and which can be moved along the line to a desired position, yet will not slip once adjusted and which will not be dislodged when caught in debris or the like. Some of the above listed patents describe floats which can be attached to a fishing line without tieing, but such designs have been noted to require engagement of the line with external hook devices, use of insertable plugs to maintain the float in a given position, the use of complex inserts, and designs which appear to be expensive to produce. Therefore, there is a need for a simple float which can be attached to the fishing line by simply sliding a slotted portion of the float over the line, which will make a positive engagement with the line, which can then be moved along the line by simply sliding the float and which can be produced at a very low cost.

SUMMARY OF THE INVENTION

The present invention represents an improvement in fishing floats or bobbers. A buoyant float body may have a spherical shape or an ellipsoidal shape. A slot is provided essentially half way through the body of the float to a central axis thereof, the slot having a width suitable for the diameter of the line with which the float is to be used. The float body may be constructed as two symmetrical halves which, during assembly, are cemented together to form the selected shape. Each half of the float body may have opposing complementary ridges formed therein with each ridge formed to apply tension to the line. When the float is placed on a line, the line will slide between the opposing ridges to the central axis of the float with the ridges maintaining sufficient tension on the line to prevent slippage in normal use. However, with slight force the float may be moved along the line. A small hook is formed in each body half such that the assembled float has a hook at each end of the slot. The line engages the hooks such that any forces which would tend to move the line out of the slot are counteracted.

The body portion of the float may be made from any of numerous suitable buoyant materials such as cork, balsa wood, hollow plastic halves, and the like. In one embodiment, the halves are formed from blown plastic to provide an efficient low cost construction. The hooks prevent dislodgement of the float from the line, yet permit sliding of the float along the line without damage thereto.

It is therefore a principal object of my invention to provide an improved fishing float or bobber which can be quickly and easily attached and detached from a fishing line and which can be moved easily along the line to a desired position, yet which will not move during use.

It is another object of my invention to provide a float having a fishing line accepting slot therein with ridges disposed to grip a line inserted in the slot and hooks at each end of the slot to prevent dislodgement of the line.

It is still another object of my invention to provide a fishing float of the type described above which can be produced at very low cost.

It is yet another object of my invention to provide a fishing float of a spherical or ellipsoidal shape.

It is a further object of my invention to provide a fishing float that may be attached to a fishing line without tieing of knots in the line and which can be quickly attached and detached from the line.

It is still a further object of my invention to provide a fishing float or bobber that can be manufactured from plastic to be free from rust, corrosion, and deterioration.

These and other objects and advantages of my invention will be apparent from the following detailed description when read in conjunction with the drawings.

DETAILED DESCRIPTION OF THE PREFERRED EMBODIMENT

Figure 1:
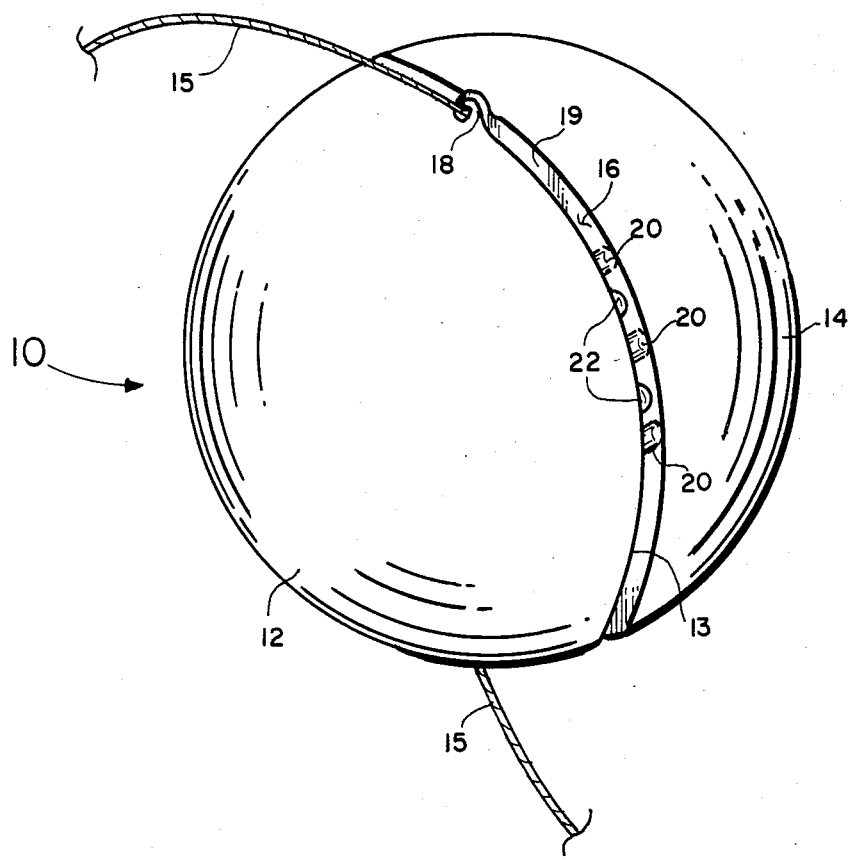
FIG. 1 is a perspective view of a fishing float installed on a line in accordance with my invention.

Although it is to be understood that my fishing float or bobber may be made in any one of a number of shapes, the spherical shape of float 10 shown in FIG. 1 is preferred. This shape is found to be relatively free from snagging on weeds and the like, such as may occur for flat end floats. As may be also noted from FIG. 1, the outside surface of my float is free from any protrusions, wires, hooks, or the like which could become fouled in weeds or other debris. Float 10 is formed from two body sections 14 and 12 shaped as will be described later to form a groove or slot 16 open to the axis of float 10. A fishing line 15 may be attached to float 10 by engaging line 15 in slot 16 so as to cause the line 15 to become aligned with the longitudinal axis.

Figure 2:
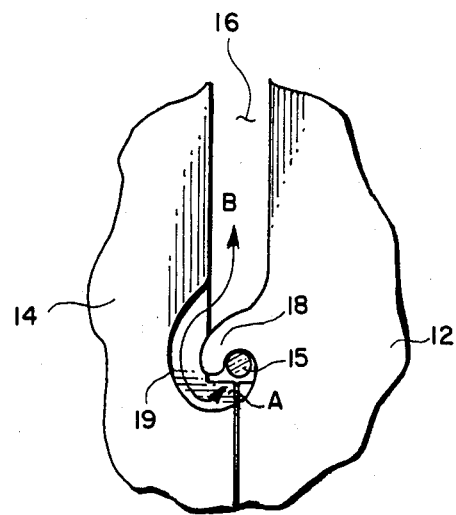
FIG. 2 is a partial view of the float of FIG. 1 showing a hook and the method of attaching a line thereto.
Figure 3:
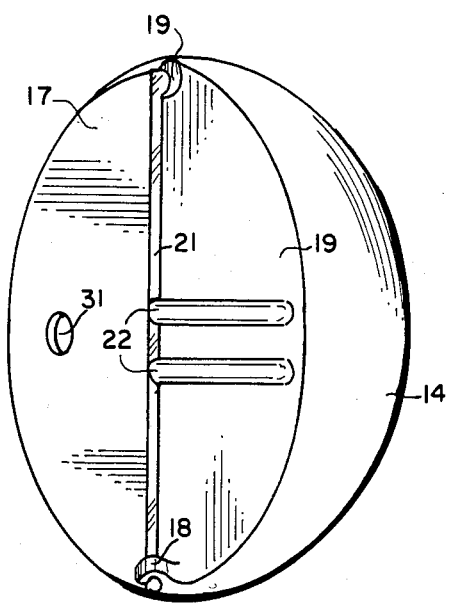
FIG. 3 is a perspective view of one half of the float of FIG. 1.
Figure 4:
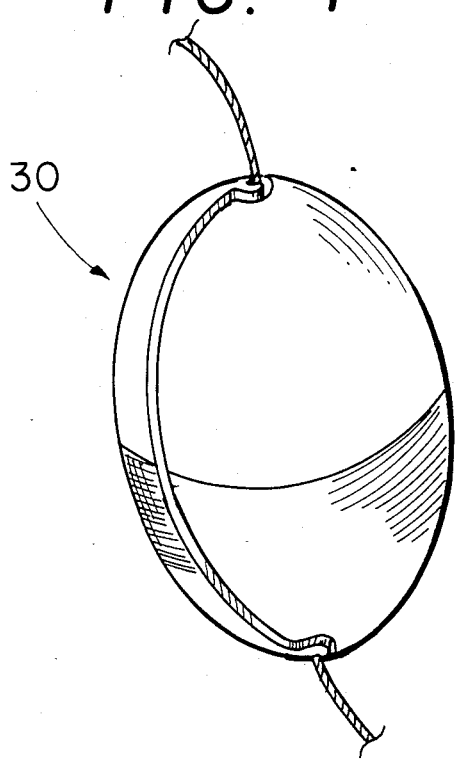
FIG. 4 is a perspective view of an ellipsoidal embodiment of my invention.

As seen in FIG. 3, the slot face 19 of body half 14 includes a plurality of ridges 22. As noted in FIG. 1, a set of complementary ridges 20 is disposed on slot face 13 (opposite slot face 19) of body half 12. Ridges 22 extend slightly above the level of step 21 such that ridges 22 interleave with ridges 20 as shown in FIG. 1 to cause a line 15 to be gripped thereby. However, with a moderate pull on line 15, the float 10 may be moved along the line. The body face 17 of body half 14 is cemented to the complementary body face (not shown) of body half 12 to form the float 10 as shown in FIG. 1. A hook 18 is molded into each body half 12, 14 as best seen in FIGS. 2 and 3. In FIG. 2, an end view along the longitudional axis of slot 16 shows hook 18 in body half 12 opposite complementary groove 19 in body half 14. It may be noted that the notch of hook 18 is aligned with the central axis of slot 16.

Having described the structure of my invention, the method of use will now be explained. The user inserts the fishing line 15 into slot 16, and with slight pressure, forces the line 15 through ridges 20 and 22 until the line is aligned with the longitudinal axis of float 10. The line 15 is fed into hook 18 at each end of slot 16 as indicated by arrow A in FIG. 2. The notch in hook 18 is aligned with slot 16, thus, line 15 is captivated by hook 18 and will resist normal forces which can occur during use from dislodging the line. When the user wishes to remove line 15 from float 10, he moves the line in the path indicated by arrow B, thereby unhooking the line from hook 18. As is to be understood, the tension produced by ridges 20, 22 is such that sufficient pressure is produced to prevent slippage of the fishing line during normal use. However, the user may move the float 10 along the line by simply holding the line in one hand and sliding float 10 therealong with the other hand.

A variety of materials is available which are suitable for float 10. For example, wood, such a balsa, may be utilized and the two body halves 14 and 12 joined by waterproof glue. The surfaces exposed to water would be sealed and painted to prevent absorption of water. Another suitable material is plastic, such as polyfoam or the like. Alternatively, sheet plastic may be used in which case shells of outer halves 14 and 12 faces 17 and 19 are separately molded. Halves 14 and 12 are then formed by cementing faces 17 and 19 to the shells 14 and 16 thereby forming two hollow body halves. The corresponding surfaces 17 of body halves 14 and 12 are then cemented together.

Figure 5:
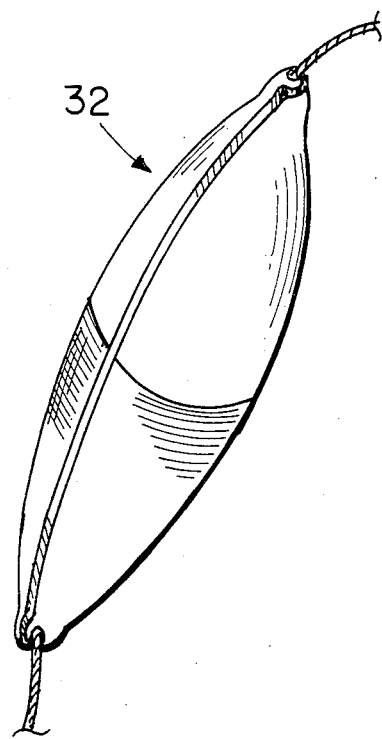
FIG. 5 is a perspective view of an elongated ellipsoidal embodiment.

My novel fishing float or bobber may be constructed in a variety of sizes to suit the needs of particular users. As previously noted, the shape of my fishing float is not critical to the operation of the invention. Alternative shapes may include an ellipsoidal float 30 as shown in FIG. 5. Another possible shape is illustrated in FIG. 6. Here float 32 is a greatly elongated ellipsoidal body which can be moved through the water with less drag than the previously described shapes.

Advantageously, my invention may be molded by a blow mold process at very low cost. The injection point in the mold may be in the body face 17 as indicated at 31 in FIG. 3. After trimming the flash, the opening in the surface of each half will be sealed when opposing surfaces of the two body halves 12 and 14 are bonded together. Thus, a lightweight, hollow fishing float will be formed having all of the novel features and advantages of my invention.

Although I have described certain specific embodiments of my invention, there will be numerous variations in design of the various elements thereof which will not depart from the spirit and scope of my invention.

I claim:

1. A unitary fishing float comprising:
    an essentially hollow buoyant body having a first central longitudinal axis provided with a slot defined by a pair of slot faces extending radially from said longitudinal axis to the exterior surface of said body and a second central axis at right angles to said first axis and parallel to said slot faces;
    a plurality of fishing line holding ridges disposed adjacent to said second axis and extending normally from said longitudinal axis toward the exterior surface of said body, a set of said ridges formed in each of said slot faces of said body such that the ridges of one of said slot faces interleaves with the ridges of the other of said slot faces; and
    a pair of hooks homogeneously formed integral with said body and disposed within said slot, one of said hooks at each end thereof, each of said hooks having a line holding notch aligned with said longitudinal axis, one of said slot faces having a respective access groove complementary to each hook and lying outside said slot.

2. The float as defined in claim 1 in which said body comprises two body halves, said body halves bonded together to form said body.

3. The float as defined in claim 1 in which said body has a spherical shape.

4. The float as defined in claim 1 in which said body has an ellipsoidal shape.

5. The float as defined in claim 1 in which said body is formed from wood.

6. The float as defined in claim 1 in which said body is formed from plastic.

7. The float as defined in claim 1 in which said body is formed from cork.

8. The float as defined in claim 1 in which said body is formed from two complementary body halves wherein each of said body halves is formed from plastic by a blow molding process and wherein said body is formed by bonding said two complementary body halves together.

* * * * *